(12) United States Patent
Liburdi

(10) Patent No.: US 12,353,378 B2
(45) Date of Patent: Jul. 8, 2025

(54) SERVERLESS DATA INGESTION FOR TRANSFORMING AND DELIVERING DATA IN SYSTEM ENDPOINTS

(71) Applicant: Brex Inc., Draper, UT (US)

(72) Inventor: Joshua Liburdi, Santa Rosa, CA (US)

(73) Assignee: Brex Inc., Draper, UT (US)

( * ) Notice: Subject to any disclaimer, the term of this patent is extended or adjusted under 35 U.S.C. 154(b) by 0 days.

(21) Appl. No.: 18/302,239

(22) Filed: Apr. 18, 2023

(65) Prior Publication Data
US 2024/0354293 A1    Oct. 24, 2024

(51) Int. Cl.
G06F 16/21        (2019.01)
G06F 18/10        (2023.01)

(52) U.S. Cl.
CPC ............ G06F 16/217 (2019.01); G06F 18/10 (2023.01)

(58) Field of Classification Search
CPC .................................................... G06F 16/217
USPC .......................................................... 707/704
See application file for complete search history.

(56) References Cited

U.S. PATENT DOCUMENTS

| | | | | |
|---|---|---|---|---|
| 11,494,493 | B1 * | 11/2022 | Baird | H04L 9/0894 |
| 2017/0075721 | A1 * | 3/2017 | Bishop | G06F 9/4881 |
| 2021/0019277 | A1 * | 1/2021 | Jha | G06F 13/42 |
| 2021/0097047 | A1 * | 4/2021 | Billa | G06F 16/254 |
| 2023/0367783 | A1 * | 11/2023 | Srivastava | G06F 16/1858 |

FOREIGN PATENT DOCUMENTS

KR    20210069240 A  *  6/2021  .............. G06F 9/44

OTHER PUBLICATIONS

"Connect & Transform Your Data with Substation", 4 pages [online], [retrieved on Aug. 1, 2023]. Retrieved from the Internet: <URL:https://substation.readme.io/>.
"Brexhq/substation", 8 pages [online], [retrieved on Aug. 1, 2023]. Retrieved from the Internet: <URL:https://github.com/brexhq/substation>.
"Take Control of Your Observability, Security, and Telemetry Data—Cribl", 8 pages [online], [retrieved on Aug. 1, 2023]. Retrieved from the Internet: <URL:https://cribl.io/>.

* cited by examiner

*Primary Examiner* — Syling Yen
(74) *Attorney, Agent, or Firm* — Perkins Coie LLP

(57) ABSTRACT

There are provided systems and methods for serverless data ingestion for transforming and delivering data in system endpoints. An entity, such as company or business, may utilize computing services provided by a service provider. When providing these services, one or more computing services, processors, or the like of the service provider's computing architecture may be used. This may include use of serverless computing environment to delivery data to internal and/or external endpoints. To automate data delivery in a serverless environment, computing code for data processing and delivery pipelines may be configured and deployed in the serverless environment. This allows applications and microservices to be executed in the serverless environment to provide a computing architecture for without requiring servers and designation of server clusters. The data pipeline may provide operations for ingesting, transforming, and loading data when received for delivery to endpoints.

22 Claims, 5 Drawing Sheets

SERVERLESS DATA INGESTION FOR TRANSFORMING AND DELIVERING DATA IN SYSTEM ENDPOINTS

TECHNICAL FIELD

The present application generally relates to ingesting, transforming, and loading (ITL) data in a system for different system endpoints and more specifically to providing ITL services for data in serverless computing environments using computing code and system infrastructure.

BACKGROUND

Service provider systems may provide services to customers, such as businesses and companies, through computing systems and networks. These computing systems and networks may also be utilized by internal users, where the systems generate, transmit, and process security event logs, system audit logs, and the like when processing data. When performing data processing, generating and transmitting logs, and the like, different data processors, microservices, decision services, and/or other computing resources of the service provider systems may be used. However, a high-level data processing flow may implement various computing services that may each ingest data and deliver data to different endpoints using a system architecture, such as one with specifically configured and designated servers, devices, databases, data stores, and the like. This creates specific system architectures that are costly, specifically designed and implemented, and difficult to change once deployed. Further, data processing and delivery may be slowed and made unusable during system or component downtimes, servicing, updates, and the like. Server computing machines also suffer from issues with specific resource allocation and cost or slowdown with scalability.

Therefore, there is a need to address deficiencies with conventional computing systems and architectures used by service providers to ingest, transform, and deliver data, such as security event, system audit, network traffic, and other logs or files, to endpoints in an efficient, reliable, and scalable manner.

Figure 1:
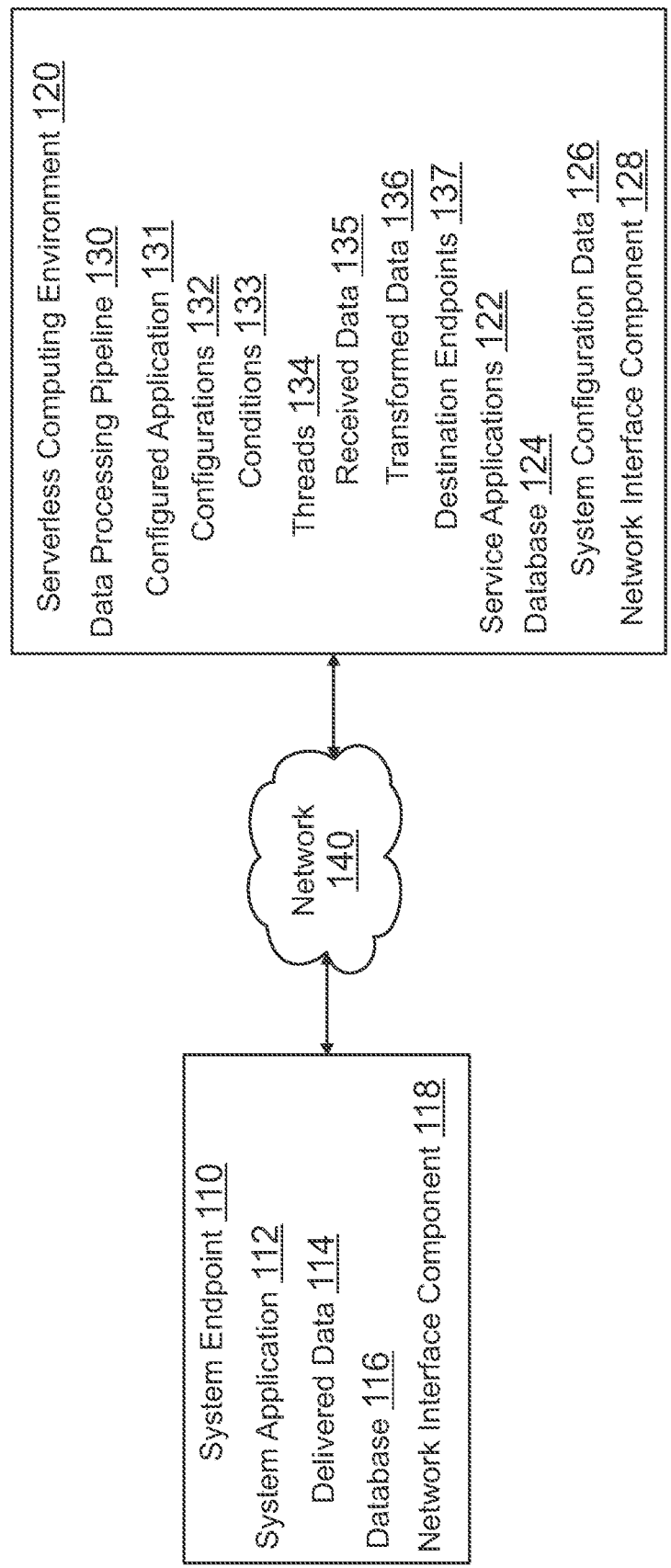
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods for serverless data ingestion for transforming and delivering data in system endpoints. Systems suitable for practicing methods of the present disclosure are also provided.

In service provider systems, a networked system and provider may include a computing framework and architecture to provide payment gateways, billing platforms, eCommerce platforms, invoicing, and additional services. These systems may include internal and/or external networks of devices and servers, which may be used when receiving, generating, transmitting, and otherwise processing data that is delivered to endpoints. However, with large and complex computing architectures and infrastructures that provide these services, multiple data processing stacks, applications, computing services and processors, and/or corresponding databases and data tables may be needed. This causes inefficiencies when specific servers, devices, databases, and the like are configured and implemented in a computing system for data processing and delivery to different endpoints. For example, server systems may be required to be specifically built, configured, and deployed for task-specific operations and requirements. While server computing machines may be used to process tasks for short or long amounts of time and provide offline data processing that does not require scalability (e.g., many operations) or a fast response time, servers may also require maintenance and updates, go offline or crash due to errors, and/or may become out of date and obsolete, incompatible, or inefficient for their designated task. Further, fast response times may require specialized servers, and have difficulty with low scalability and scaling out for many tasks, while more powerful and more robust servers and machines may have high cost and resource usage.

In order to solve these issues with server computing architectures, the service provider may implement computing services in a serverless computing environment, such as a cloud computing environment. Serverless cloud computing allows a service provider to utilize and request allocation of computing resources dynamically for data processing jobs, such as by selecting, utilizing, or requesting processing of tasks by certain machine clusters, computes, or the like. These resources are specified by the customer, and the customer is charged for and/or provided allocated resources and run time for the data processing task being performed. While cloud computing architectures may provide high scalability and fast response times, cloud and serverless environments may be designed to handle light processing jobs based on the required disk space, type of central processing unit (CPU), amount of memory, or other resource that is requested. Further, cloud systems generally do not have specific infrastructures for certain tasks, such as ITL services for data. Thus, the service provider may provide a computing infrastructure for ITL of data received and/or generated by a service provider's system for system endpoints (e.g., end user devices, servers, network addresses, etc.) that utilize computing code through applications and microservices as the infrastructure.

Thus, the service provider may implement a computing architecture that ingests data received by the service provider's system(s), transforms the data to particular data formats used or required by system endpoints, and loads the data for delivery by data sinks to those system endpoints using computing code as the architecture in a cloud or other serverless computing environment. This may be done through implementing applications and microservices that create processing threads to process data through processing jobs and tasks executed by those threads. The applications and microservices may be designated, customized, configured, and implemented using data packages provided by the service provider or another service provider that provides a platform for creating, uploading, sharing, and customizing the data packages for specific tasks, received data for endpoint delivery, and/or different types of serverless or other computing systems. On startup and/or when executed, the applications and microservices may therefore execute operations to provide data delivery via the serverless computing environment by utilizing different resources, computes, and/or machines/pools of machines available to the service provider.

In this regard, a service provider system may offer computing services, software, online resources and portals, and infrastructure to one or more customer entities (e.g., businesses or companies). The service provider may have a large and/or complex computing architecture that is used to provide these computing services to users. This computing architecture may also provide computing services to internal users of the service provider, such as employees, administrators, coders and developers, data scientists, executives, and other users that may utilize internal systems for communications, data review and processing, and implementation of the service provider's services to customers, end users, and other external entities. Such, implementation of computing services and use of those services may have resulting data that is received, generated, and/or processed by the service provider's computing system and architecture, such as by different endpoints within the service provider's system. These endpoints may include devices, servers, databases and stores, network or communication addresses, and the like. The data may therefore be required to be delivered to different endpoints by the service provider's systems.

In more detail, the service provider may provide a computing infrastructure for data delivery through ITL operations using computing code in a serverless computing environment. Initially, the service provider or another separate third-party service provider and/or online resource may provide a platform, website, web or software application, or the like for creating, configuring, and deploying the computing code for the serverless computing infrastructure using ITL operations for data delivery. This may be done through a setup process and operations with data packages for pre-coded applications, microservices, and/or data processing operations for ITL of data. For example, an online portal or resource may provide coded data packages that are pre-coded and preconfigured to execute certain operations and/or provide an application or microservice (e.g., a computing decision service that may correspond to a computing architecture that arranges an application as a collection of independent computing services) for such operations.

These operations may be for ITL data for a system in a cloud computing environment, thereby providing the computing code necessary to create a computing architecture in a cloud or serverless computing environment that executes the code using computes or pools of machines. Developers and system administrators may access these data packages and/or applications and further configure those for the particular system, data, and data delivery needs and goals of the service provider implementing the computing code in a serverless environment. In some embodiments, the data packages and applications may be provided as an open-source data pipeline and data transformation toolkit, which may be written in a specific programming language such as Go (e.g., a compiled high-level programming language) or the like. This toolkit may provide modular and cloud native data pipelines for data delivery by evaluating, processing, and delivering data to endpoints through custom data processing applications and microservices. The architecture may be built for use with a serverless computing environment or platform, such as Amazon Web Services (AWS) and may use Jsonnet for configuring processors and applications as code in the serverless environment with Terraform for interfaces for deploying pipelines and microservices in such an environment.

In this regard, deployment of the computing code as architecture may require configurations for the applications and/or microservices creating the threads and performing the ITL of data. The configurations may correspond to data processing configurations for application conditions that are used to create processing threads and execute such threads for different ingestion operations, transformation operations, and/or load operations of the data (and corresponding transformed data in a data format). Each application condition may correspond to a coded operation that provides a method for evaluating data using user-defined success or failure criteria. These may be built into data processors that allow for per-event data processing, which may be in time series based on incoming data and timestamps of such data and provide data evaluation capabilities. The conditions may be implemented through inspectors and operators, where inspectors are inspection methods for evaluating data, such as based on content, IP address, length, regular expression (regex), strings, or the like. For example, an inspector may be "string equals 'foo'," "string matches/^[Fo][Oo][Oo]/," "length (value)>=3," "IP address is loopback," "IP address is private," or "data is gzip." Operators may correspond to groups or collections of inspectors that implement data evaluation patterns and utilize an operator (e.g., a logical or mathematical action or operation, such as AND, NOT, AND NOT, etc.). For example, an operator may be "string matches/^[Fo][Oo][Oo]/AND length (value)>=3," "NOT IP address is public AND NOT IP address is private," or "NOT data is gzip OR NOT length (value)>=3." This allows for complex data evaluation through several inspectors and combining operators.

The conditions may be used for ingestion of data by evaluating data and determining where the data should be delivered, as well as any data formats that the data should be transformed to prior to delivery. For example, the conditions may be used to identify the data and/or data patterns for delivery to system endpoints in a particular data format. The application and/or microservice, in order to ingest data, as well as transform and load the data for endpoints, may, on startup and/or application execution, create and execute multiple processing threads for each ITL operation. For example, separate data processing threads may be initiated and created for ingesting data, transforming data, and loading data. The threads may be created in reverse order of a load thread (or multiple, where supported for different data sinks and endpoint delivery and consumption of data), one or more transform threads, and then one or more ingest threads. On startup, the application (or microservice) may load the data processing configurations and create concurrent threads to ingest, transform, and load data that is shared across threads using a pipeline pattern (e.g., concurrent programs that process data in stages connected by channels).

Errors in any thread, including the main thread, may interrupt the application and return an error for restart, reloading, and/or error troubleshooting.

As data is received and/or processed through a data processing flow, multiple computing services may process the data and/or persist to one or more corresponding databases, which may correspond to system endpoints for data processing. For example, an internal user may login or may perform an activity in the system, where data may then flow to one or more endpoints. Such data may correspond to system logs and log files, such as those recording system events, data processing, network traffic, and the like (e.g., security event logs, system audit logs, etc.). An external user may also perform activities with the system that cause event logs and files to be generated. The data and/or an identifier for this log, file, and/or other data may be received and flow through processing stacks and services, and the data may be transmitted to and/or processed by the separate components, processors, micro and/or decision services, and other computing services. Each computing service may have one or more corresponding databases having data tables corresponding to the computing service. Thus, the threads may be used for ITL operations when receiving, ingesting, transforming, and loading this data.

Once the threads have been created and started, data may be ingested and each item may be sent in the pipeline to one or more transform threads. Such threads may have a corresponding data format for data transformation and may prepare what the data looks like (e.g., what format the data is in) for the corresponding endpoint to receive the data. This allows for data delivery to different endpoints in different formats. The transform threads may evaluate and process the data in series by checking for success conditions, applying processes (e.g., methods for processing data using coded processors in a serverless environment that provide data transform capabilities that transform data as singletons, such as individual items or datum, or batches, such as groups of datum), and preparing or formatting the data for the corresponding system endpoints.

Thereafter, the transform threads may send the data in the pipeline to a single load thread; however, multiple load threads may be used as needed for different data sinks and/or endpoints. The load thread may deliver data to an internal or external destination, such as a system designated endpoint, using a data sink (e.g., a database or other destination of a data flow where the data may reside for a definite or indefinite amount of time of receiving, loading, and/or use). The system endpoints for receipt of data may be designated based on the type of data, the contents of the data, sender identifier or address for the data, or other parameter associated with the data and/or transmission/generation of the data. Thus, the serverless data ingestion, transformation, and loading may provide faster, more efficient, and more coordinated data delivery in computing systems without requiring specifically assembled computing systems and architectures. This allows for flexible systems that may be updated and changed as needed for system configurations and requirements. Further, the serverless environment may reduce computing resource designation and usage for internal systems of service providers by offloading processing costs and requirements to cloud systems. As such, computing code in serverless environments may function as computing architectures thereby improving the computing systems for ITL operations of service providers.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways, and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a system endpoint 110 and a serverless computing environment 120 in communication over a network 140. A user (not shown) may correspond to an employee, administrator, developer, executive, contractor, shareholder, or other suitable person of a company (not shown and generally referred to herein as an "employee") associated with system endpoint 110, which may be used to utilize the services provided by serverless computing environment 120 from a service provider. Serverless computing environment 120 may process and deliver data to system endpoint 110, such as during computing system use, login, communications, authentication, underwriting, account generation or usage, electronic transaction processing, expense management, or the like. In this regard, serverless computing environment 120 may provide ITL operations for data during data delivery to system endpoint 110. In other embodiments, system endpoint 110 may also be an external endpoint used by external end users, such as customer and customer businesses or entities of the service provider.

System endpoint 110 and serverless computing environment 120 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 140.

System endpoint 110 may be utilized by an employee, contractor, affiliate, or owner of an entity or company that employs one or more users, for example, to utilize and/or interact with computing services provided by serverless computing environment 120. For example, in one embodiment, system endpoint 110 may be implemented as a personal computer (PC), telephonic device, a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data. In this regard, system endpoint 110 includes one or more processing applications which may be configured to interact with serverless computing environment 120. Although only one system endpoint is shown, a plurality of communication devices may function similarly.

System endpoint 110 of FIG. 1 includes a system application 112, a database 116, and a network interface component 118. System application 112 may correspond to executable processes, procedures, and/or applications with associated hardware. In other embodiments, system endpoint 110 may include additional or different modules having specialized hardware and/or software as required.

System application 112 may be implemented as specialized hardware and/or software utilized by system endpoint 110 to access and/or utilize services provided by serverless computing environment 120, such as internal and/or external users when engaging computing services used for underwriting for credit, onboarding and/or management of an account, electronic transaction processing, and/or usage of other services. These computing services may be provided by a service provider associated with and/or utilizing serverless computing environment 120, which may be provided to an entity (e.g., an organization, business, company, or the like including startup companies that may require credit services). For example, a user associated with the entity may utilize system endpoint 110 to receive data and/or request data processing for data from serverless computing environment 120, which may be delivered using ITL operations provided in serverless computing environment 120. In this regard, system application 112 may correspond to software, hardware, and data utilized by a user associated with system endpoint 110 to enter, store, receive, and process data with serverless computing environment 120, such as delivered data 114. Delivered data 114 may be delivered to system endpoint 110 and received via one or more data processing threads and operations for ITL of data provided in serverless computing environment 120, which may utilize computing code within a system architecture for such ITL operations. Thus, delivered data 114 may be provided to system endpoint 110, and delivery from serverless computing environment 120 using an application and/or microservice for a data processing pipeline 130 may be provided in serverless computing environment 120 (e.g., a cloud computing environment, platform, system, nodes, and/or computes), as further discussed herein. In other embodiments, the computing services provided to serverless computing environment 120 and/or associated with delivered data 114 may further include email and messaging, social networking, microblogging, media sharing and/or viewing, streaming, and/or other data processing services.

In various embodiments, system application 112 may include a general browser application configured to retrieve, present, and communicate information over the Internet (e.g., utilize resources on the World Wide Web) or a private network. For example, system application 112 may correspond to a web browser, which may send and receive information over network 140, including retrieving website information, presenting the website information to the user, and/or communicating information to the website, including payment information. However, in other embodiments, system application 112 may include a dedicated software application of serverless computing environment 120 or other entity. System application 112 may be configured to assist in onboarding for accounts, establishing and maintaining the accounts, engaging in electronic transaction processing, receiving delivered data 114 and/or other data from data sinks and load threads, and/or otherwise engaging in computing services provided by serverless computing environment 120 and/or a corresponding service provider for system endpoint 110.

System endpoint 110 may further include database 116 stored in a transitory and/or non-transitory memory of system endpoint 110, which may store various applications and data and be utilized during execution of various modules of system endpoint 110. Database 116 may include, for example, identifiers such as operating system registry entries, cookies associated with system application 112, identifiers associated with hardware of system endpoint 110, or other appropriate identifiers, such as identifiers, tokens, and/or fingerprints for devices, applications, accounts, and/or users. Database 116 may further include delivered data 114 and the like, which may be delivered, automatically or on command, from serverless computing environment 120 using one or more data processing threads for ITL operations using applications and/or microservices provided and customized by a corresponding service provider.

System endpoint 110 includes at least one network interface component 118 adapted to communicate with serverless computing environment 120 and/or another device or server. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices.

Serverless computing environment 120 may be maintained, for example, by an online service provider, which may provide services for account creation and onboarding, credit or loan underwriting services, payment and transaction processing services, expense management services to companies, businesses, and other entities, and/or other computing services, which may include data delivery services associated with providing such computing services. In this regard, serverless computing environment 120 includes one or more processing applications which may be configured to interact with system endpoint 110 and other devices or servers to facilitate provision of data through data delivery using computing code as an architecture for ITL operations in a cloud or serverless environment. In one example, serverless computing environment 120 may be provided by BREX®, Inc. of San Francisco, CA, USA. However, in other embodiments, serverless computing environment 120 may be maintained by or include other types of credit providers, financial services providers, and/or other service providers, which may provide services to users and entities.

Serverless computing environment 120 of FIG. 1 includes service applications 122, a data processing pipeline 130, a database 124, and a network interface component 128. Service applications 122 and data processing pipeline 130 may correspond to executable processes, procedures, and/or applications with associated hardware. In other embodiments, serverless computing environment 120 may include additional or different modules having specialized hardware and/or software as required.

Service applications 122 may correspond to specialized hardware and/or software to allow entities (e.g., the entity associated with system endpoint 110) to provide computing services to users, entities, and the like, which may include account services, provide credit or loan extensions via underwriting models and/or services, process payments and transactions using one or more payment cards or other financial instruments, provide expense management systems, and/or provide additional services to users and/or entities. Service applications 122 may correspond to one or more services provided by, in, and/or is association with serverless computing environment 120 to an entity, which may include use, maintenance, and/or engagement by internal and/or external users and entities. In some embodiments, the services may include account and/or credit services where service applications 122 may include underwriting systems and models, which may extend credit or other loans based on parameters for an entity. Using the accounts and/or credit, electronic transaction processing services may also be provided to users and entities via service applications 122. In further embodiments, service applications 122 may provide expense management services, such as those that may integrate with an entity's expense, payroll, human resources, business panning, and the like to provide enterprise resource planning (ERP) services. In other embodiments, service applications 122 may be provided by other computing systems and/or environments, such as dedicated server computing systems of a service provider that may further use serverless computing environment 120 for ITL operations and services for data delivery.

In some embodiments, the services may be used to receive payment instruments associated with a bank account, extended credit, and/or funding of the company, such as one or more company credit cards. In this regard, an entity may first establish an account with service applications 122 by providing company or entity data and onboarding through service applications 122. The company or entity data may include IRS EIN information and/or other information that may be utilized to verify a company, business, organization, or other entity. Such information may further include bank account and funding information, such as verified funding from investors, available funds in a bank or financial account, and the like. If qualified based on policies, rules, and/or models, serverless computing environment 120 may onboard the entity associated with system endpoint 110 for services provided by serverless computing environment 120. This may include credit extended to the entity based on entity financial data. In this regard, serverless computing environment 120 and/or another issuing entity may provide a payment instrument that is managed by service applications 122. For example, serverless computing environment 120 may issue one or more credit cards for employees of the entity, which may correspond to a real or virtual credit card or other types of payment instruments and instrument identifiers that may be used for company payments.

For example, service applications 122 may receive and/or generate delivered data 114 for system endpoint 110, which may include ingested, transformed, and loaded data received for the service provider and/or system endpoint 110 and processed using data processing pipeline 120. Where such data may include event, traffic, and/or security logs, service applications 122 may provide such logs from corresponding events that occur with the service provider. Service applications 122 may further be used to provide computing services to users, such as to process transactions. In this regard, service applications 122 may utilize one or more payment networks to process a transaction, such as by issuing a payment over a payment network and/or by requesting payment by a credit issuing bank or institution to the merchant and/or acquiring bank or institution. In other embodiments, the credit card and payment network may be managed by another entity and/or payment network, where an integration by serverless computing environment 120 with the network may allow for acquisition of transaction data by service applications 122 in real-time or substantially in real-time. Service applications 122 may further issue transaction histories for delivered data 114 and provide accounting and recordation of transaction data, such as with the ERP resources provided by service applications 122.

Service applications 122 may include computing services that correspond to one or more data processing stacks, components, processors, microservices, and/or decision services of a service provider to provide these services utilized by system endpoint 110 and/or other devices or servers. The computing services may correspond to different computing systems and/or processors of the service provider that may provide a data processing service and/or operation for data that is delivered to system endpoint 110. For example, the computing services may be associated with login, authentication, transaction processing, verification, risk and/or fraud detection, payment networks and/or ACHs, and the like. Use of computing services by internal and/or external users may create logs, such as security logs and/or system audit logs. Thus, data processing pipeline 130 may be invoked in order to process received and/or generated logs and other data that is delivered to system endpoint 110.

Data processing pipeline 130 may correspond to specialized hardware and/or software to allow end users, administrators, data scientists, engineers, compliance officers, and other users associated with serverless computing environment 120 to receive, process, and deliver data, such as data received and/or generated by service applications 122 through different computing services, to different servers, devices, systems, databases, or the like including system endpoint 110 for an internal or external entity. In some embodiments, data delivery may include operations to ingest, transform, and load data using processing threads created in a serverless or cloud environment provided by serverless computing environment 120. For example, data processing pipeline 130 may execute a configured application 131 that has been configured, designed, and deployed using data packages and configurations 132 that may be pre-coded and configurable to the specific needs of the service provider delivering data to system endpoint 110 using data processing pipeline 130. The data packages used to generate configuration 132 may be coded in Go and use Terraform, Jsonnet, and/or AWS AppConfig to deploy data processing pipeline 130 on startup of configured application 131. Those data packages may be provided by serverless computing environment 120 and/or another service provider or online resource, which may be accessed, used, and specifically configured for the particular task or job of data delivery, system, data, and/or endpoints associated with data processing pipeline 130. In some embodiments, configured application 131 may correspond to a microservice that may correspond to a combination of standalone and integrated services.

On startup, configured application 131 may load configurations 132 for executing data processing pipeline 130 for ITL of data to system endpoint 110 and/or another endpoint. Configurations 132 may include conditions 133, which may be built using Terraform, Jsonnet, and/or AWS AppConfig and coded in Go and/or from Go code and data packages. Conditions 133 may be built from inspectors and operators that include groups of inspectors joined and/or connected by one or more operators (e.g., mathematical or logical actions). Conditions 133 may allow for inspection of data, determination of a data transformation, and identification of a delivery endpoint. This allows use of the code for conditions 133 to serve as the infrastructure in serverless computing environment 120 instead of managing and assigning servers and/or server clusters for data processing and delivery.

After startup of configured application 131, configurations 132 for conditions 133 may cause creation and generation of threads 134 for processing of data during data delivery. Threads 134 may correspond to data processing threads for each ingest operation, transform operation, and load operation. Thus, multiple ingest threads, transform threads, and load threads may be generated for a data delivery operation. As data enters to the system and/or a data processing operation is requested for existing data, one or more data processing flows for data delivery may be used to deliver the data to system endpoint 110. Threads 134 may process received data 135 using ingest threads to ingest and inspect the data for data parameters and information used to determine a data transformation and delivery requirement, goal, or process. Threads 134 may further include transform threads that correspond to processes for transforming data to transformed data 136 in a particular data format for the corresponding endpoint that receives the delivered data. Transformed data 136 is then loaded by a single load thread, although multiple load threads may be used when required, to a data sink that may provide the data to destination endpoints 137. Destination endpoints 137 may receive transformed data 136 from the load thread and/or data sink, which may then store, process, or otherwise utilize the data. The operations and features of data processing pipeline 130 for performing ITL operations in a serverless or cloud environment using computing code as a system architecture are described in further detail with regard to FIGS. 2-4 below.

Additionally, serverless computing environment 120 includes database 124. As previously discussed, the user, entity, and/or entity may establish one or more accounts with serverless computing environment 120. Account data stored by database 124 may include customer credit accounts and other entity information, such as name, address, entity organization and/or formational information (e.g., incorporation, tax, and/or good standing documents), funding information (e.g., bank balances and/or incoming funding), additional user financial information, and/or other desired entity data. Further, database 124 may also include data for delivery and/or delivered data, such as received data 135 and/or transformed data 136. Database 124 may also include system configuration data 126, which may correspond to a configuration of a system and data processing pipeline 130 for data delivery.

In various embodiments, serverless computing environment 120 includes at least one network interface component 128 adapted to communicate with system endpoint 110 and/or other devices or servers over network 140. In various embodiments, network interface component 128 may comprise a DSL (e.g., Digital Subscriber Line) modem, a PSTN (Public Switched Telephone Network) modem, an Ethernet device, a broadband device, a satellite device and/or various other types of wired and/or wireless network communication devices.

In various embodiments, one or more of the devices, systems, and/or components of system 100 may access and/or utilize one or more computing systems or architectures of a banking or financial institution that may provide data processed by serverless computing environment 120. For example, the financial institutions may include a computing system and/or network utilized for funding balances within accounts, such as bank and/or financial accounts of funds available to business entities. The financial institution(s) may further provide resolution of payment requests and electronic transaction processing, which may be governed by permissions (e.g., acceptances and denials) of payment requests for transaction processing by serverless computing environment 120. In this regard, the financial institution(s) may provide one or more accounts that include balances available to an entity, such as bank accounts and other accounts that include assets of the business entity. A financial institution may correspond to an acquiring and/or issuing bank or entity that may hold accounts for users and/or assist in resolving payments.

Network 140 may be implemented as a single network or a combination of multiple networks. For example, in various embodiments, network 140 may include the Internet or one or more intranets, landline networks, wireless networks, and/or other appropriate types of networks. Network 140 may correspond to small scale communication networks, such as a private or local area network, or a larger scale network, such as a wide area network or the Internet, accessible by the various components of system 100.

Figure 2:
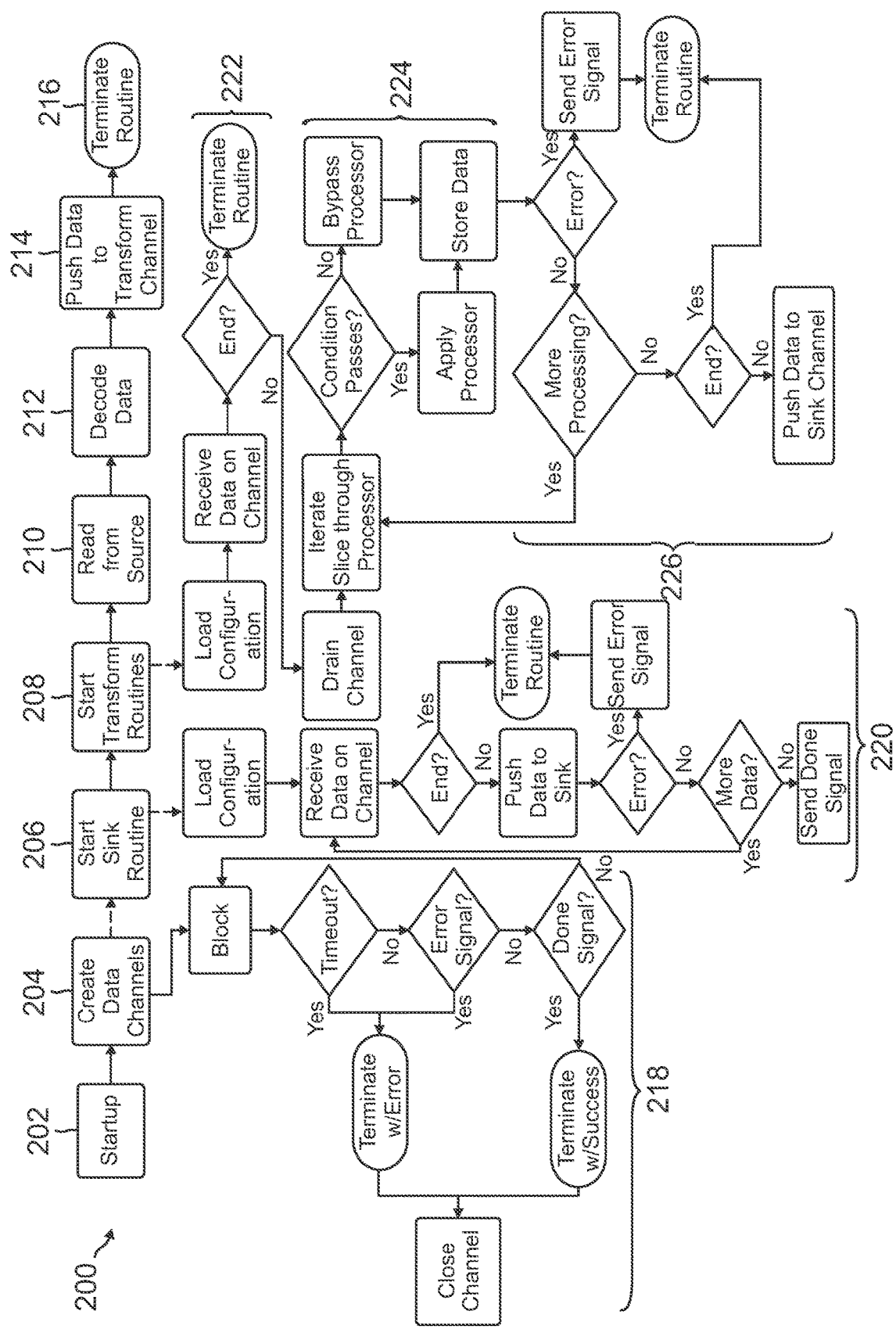
FIG. 2 is an exemplary diagram of operations executed by an application and created threads for ITL of data for system endpoints using computing code as an infrastructure in a serverless computing environment, according to an embodiment.

FIG. 2 is an exemplary diagram 200 of operations executed by an application and created threads for ITL of data for system endpoints using computing code as an infrastructure in a serverless computing environment, according to various embodiments. Diagram 200 of FIG. 2 includes a representation of ITL data processing operations for data delivery to endpoints by serverless computing environment 120 using data processing pipeline 130 discussed in reference to system 100 of FIG. 1. In this regard, diagram 200 may be executed by data processing pipeline 130 in a cloud or other serverless environment using computing code as the system architecture for data delivery.

In diagram 200, initially a startup occurs at step 202, where the startup may correspond to execution of one or more applications and/or microservices in a cloud or other serverless computing environment and system. This application may be configured for data delivery tasks required by the incoming data and/or requirements of data endpoints and ITL of the data. The application then begins creation of data channels for data delivery to endpoints at step 204. The data channels may correspond to streaming and/or data communication channels used during data delivery to different system endpoints. Step 204 may then proceed to step 206, but may also proceed to sub-steps 218 discussed below. During step 206, sink routines are started, which may correspond to load threads that are created for loading data to data sinks for data delivery. The threads are created in reverse order of the ITL operations, such as by first creating the load thread(s).

At step 208, transform routines are started, which may be used to process and transform data to a particular data format and/or otherwise based on data formats. The transform routines may include loading processors needed by the transform threads for data processing and transformation. At step 210, data is read from a source, such as where the data is received from and/or being streamed from for data delivery. During step 210, ingest threads may be started where conditions may be loaded and executed for the ingest threads to evaluate the data being read from the source. At step 212, the data may be decoded for ingesting and evaluating, which may allow for determination of the data format and/or transform threads required for data delivery of the data. At step 214, the data is pushed to a transform channel, which may then begin transforming the data. This then terminates the routing of creating and initiating the processing threads at step 216.

For sub-steps 218 from step 204, the application may determine whether to block operations to create the threads and begin the routines for ITL operations. The block may occur due to a timeout, where if the timeout occurs, the application may terminate the data channel creation routine with an error and close the channel. However, if a timeout does not occur, the application may determine if an error signal occurred, which further would cause a termination with an error and a closing of the channel. If no error occurs and the signal completes (e.g., data reading for ITL of the data is complete), the application may terminate the routine for channel creation and then close the channel.

However, if signal continues, sub-step 220 may execute based on the loaded configurations from starting the sink routine and creating load threads at step 206. Step 206 may execute, during ITL operations, sub-steps 220 to load data to sinks for data delivery, such as the transformed data in one or more transformed data formats. During sub-steps 220, configurations for loading to data sinks are loaded and data is received on the corresponding channel. It is determined whether to end the channel based on receiving data (e.g., the transformed data), where if the data is being received and the channel should not end, the data is pushed to a corresponding data sink. If no error, it is determined if more data is being received and should be pushed to the data sink. If there is an error, an error signal is sent, and the routine is terminated. If the data is pushed to the data sink, the data continues to be received on the channel; however, if not, a done or complete signal is sent to end the channel. Thus, if the channel should be ended, then the sink routine is ended and the routine is terminated.

In order to push data to data sinks, data is transformed based on the transform routines started at step 208. The transform routines from step 208 may include sub-steps 222, 224, and 226. During sub-steps 222, configurations for the transform routines and corresponding created transform data processing threads are loaded. Data is received on these data channels for the transform threads and routines, and it is determined whether to end the channels based on lack of data. If yes, the routines may be terminated, and no further data is transformed, and channels may be ended.

However, if data is being received for transformation, sub-steps 222 may proceed to sub-steps 224. During sub-steps 224, data from the channel may be drained or pulled and iterated through using a processor to determine and perform data transformations. If a corresponding condition passes for evaluation of the data, then the processor is applied to transform the data and store the data. However, if the condition is not passes, the processor may be bypassed, and the data stored. Once stored, it is determined if there is an error with the processors and/or application/microservice. The error may cause an error signal to be sent and the transform routine to be terminated. However, if no errors, it is determined if more processing by processors to transform the data is required to be applied, which would return to iterating through the data using conditions and processing using processors. However, if not, the data may be pushed to the sink channel, where sub-steps 2220 may proceed to load the data to one or more data sinks for data delivery.

Figure 3:
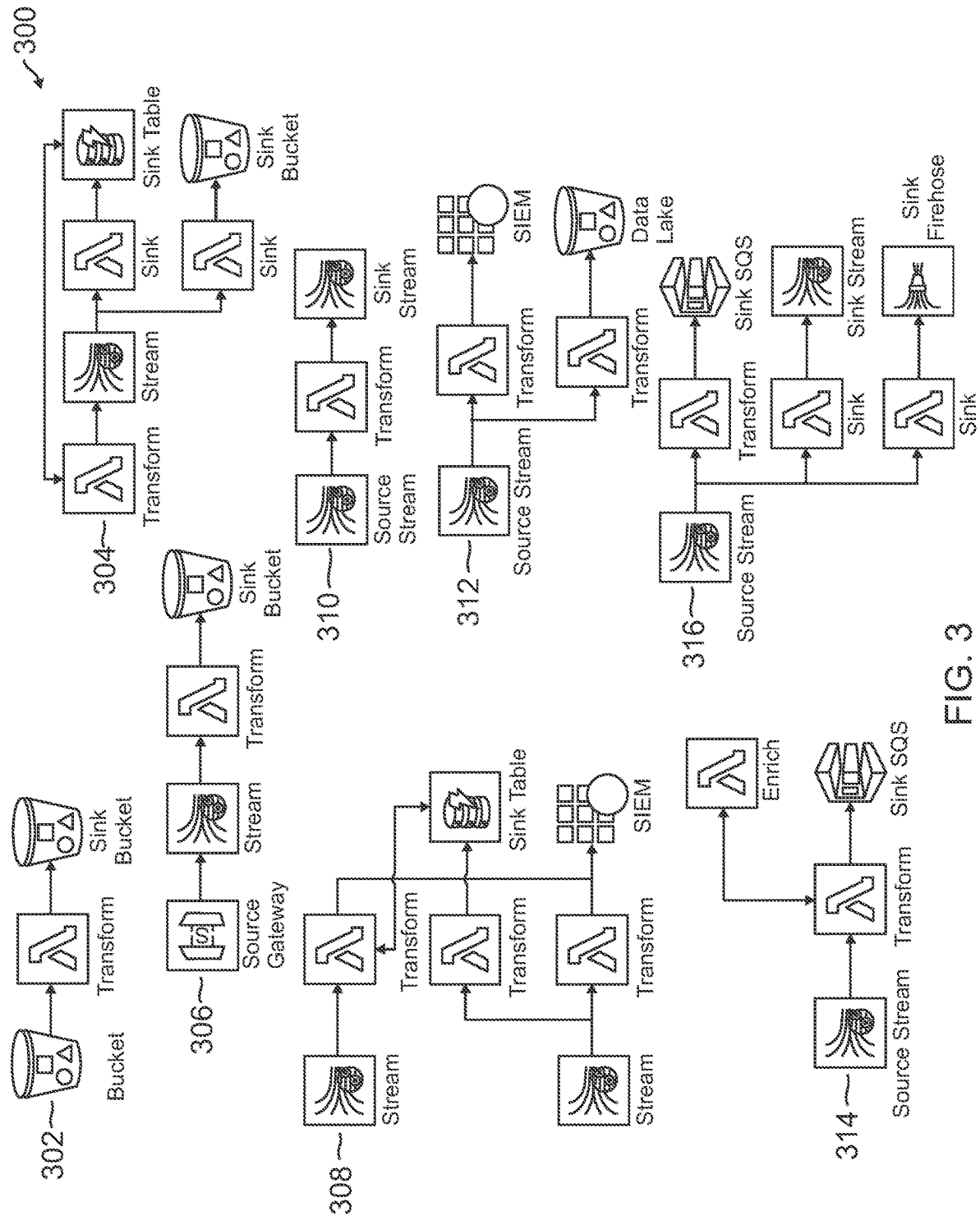
FIG. 3 is an exemplary diagram of data pipelines for implementing ITL data services in a serverless computing environment, according to an embodiment.

FIG. 3 is an exemplary diagram 300 of data pipelines for implementing ITL data services in a serverless computing environment, according to one or more embodiments. Diagram 300 includes different data pipeline examples that may be provided by computing code as the computing architecture in a cloud or other serverless environment, such as serverless computing environment 120 in system 100 of FIG. 1. Thus, the data pipelines shown in diagram 300 may correspond to data processing pipeline 130 in system 100 that is executed in serverless computing environment 120.

In diagram 300, different data pipelines are shown that may be deployed in a serverless environment on execution of an application for ITL operations. For example, a data pipeline 302 corresponds to an application and data processing flow for performing bulk data transfer between different buckets in AWS, such as AWS S3 data buckets. A source bucket may be processed using ITL operations and a transform thread to provide the data to a sink bucket. A data pipeline 304 includes operations to perform self-updating of a data cache, which may be performed using a database service such as DynamoDB that provides a NoSQL database service for key-value pairs, which may be provided through serverless computing environments. With data pipeline 304, a transform thread may be used to stream data to a sink, which is recorded in a sink table, or another sink that may then load data to a sink bucket.

A data pipeline 306 may be used to buffer web or Hypertext Transfer Protocol (HTTP) events, which may occur prior to writing to a data sink or other bucket. Thus, a source gateway may stream data to transform threads and/or other transform routines, which may transform data prior to providing to a sink bucket. With a data pipeline 308, information may be shared between different data pipelines. For example, multiple data sources may have source streams that provide data. These may each be provided to different transform threads of the data pipeline, which each may be managed by and/or utilize a security information and event management (SIEM). A third transform thread may also be used, where each thread may intermingle and share data, which may then be loaded and stored in a sink table.

In a data pipeline 310, data may be redistributed across different Kinesis shards, such as units of sequences of data records for a data stream in Kinesis or other data streamer. This allows a source stream to have data transformed using threads and stored to a sink stream for streaming and delivery to endpoints. A data pipeline 312 allows for events to be divided being a SIEM and a data lake (e.g., a central data repository for large structured and/or unstructured data). Thus, a source stream may be divided or separated, according to data inspection and evaluation, between transform threads that are then delivered to the SIEM and/or data lake.

With a data pipeline 312, data may be enriched using a serverless compute service, such as Amazon Lambda, where applications and/or backend services may be executed and run in an event-driven manner. Thus, a source stream with enrich data may be provided to one or more transform threads based on evaluation (e.g., ingestion through ingest threads) and loaded to a simple queue service (SQS) data sink. A data pipeline 316 may allow for spreading or fanning out of data between several services for data delivery and processing, such as an SQS sink, a sink stream, and/or a sink firehose. Thus, a source stream may be loaded via load threads to each data sink (including after ingestion and transformation), where each data sink then delivers the data to the corresponding service.

Figure 4:
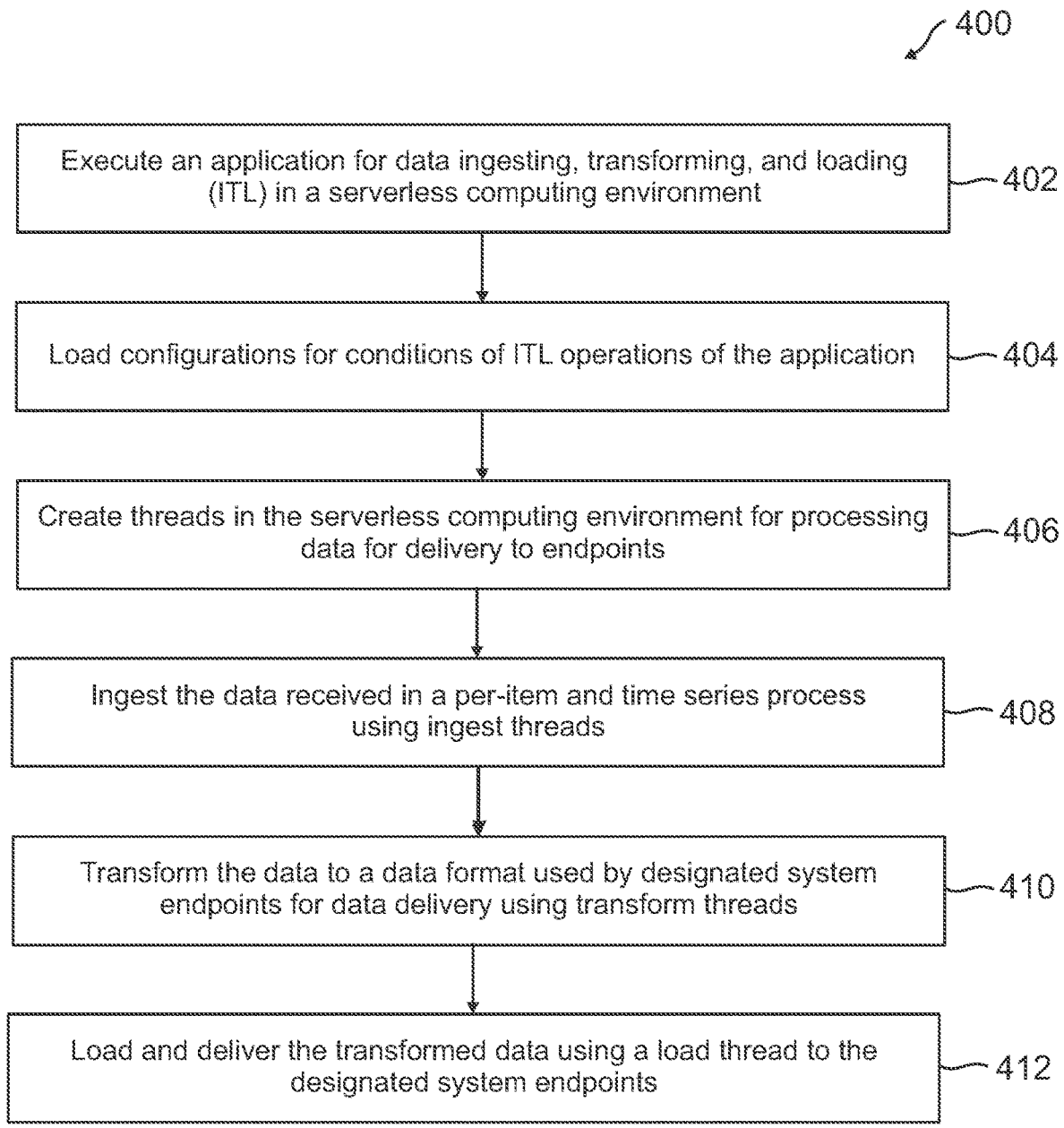
FIG. 4 is an exemplary flowchart for serverless data ingestion for transforming and delivering data in system endpoints, according to an embodiment.

FIG. 4 is an exemplary flowchart 400 for serverless data ingestion for transforming and delivering data in system endpoints, according to an embodiment. Note that one or more steps, processes, and methods of flowchart 400 described herein may be omitted, performed in a different sequence, or combined as desired or appropriate.

At step 402 of flowchart 400, an application for data ingesting, transforming, and loading (ITL) in a serverless computing environment is executed. The data may be associated with a data processing flow and may be designated for processing or storage by an endpoint. For example, data for an authentication, login, or the like. In this regard, the data may correspond to logs and/or log files having recorded events and the like. Logs may include security event logs, system audit logs, and the like that are used for system security and security auditing by different endpoints and require ingestion, transformation, and loading to different endpoints for analysis and use.

The application may ingest the data for the endpoints designated for data delivery by the system, transform the data to a particular data format for those endpoints, and load the data. When executed, such as on startup, configurations for application conditions may be determined. At step 404, configuration for conditions of ITL operations of the application are loaded. The configurations may include those established using data packages and other pre-coded data recipes or the like that may be specifically tailored and configured when implemented a computing architecture and system as computing code in a cloud or other serverless computing environment. For example, pre-coded data packages may be obtained and customized from those provided by a service provider's toolkit for implementing the data pipeline and may include those used for conditions that have inspectors and operators for data when received for ITL operations and processing by the data pipeline in the serverless environment. The conditions may be those used for an application or microservice that allow for inspecting data to determine the parameters of the data and the endpoints for delivery of the data (and corresponding data format for the delivery of the data), transform the data, and delivery the data.

At step 406, threads in the serverless computing environment for processing data for delivery to endpoints are created. Using the conditions, the application may create and execute processing threads that may each be used for ingest operations, transform operations, and load operations. For example, the threads may be used to inspect data for endpoint delivery, transform the data to a data format for the endpoint delivery of the data, and load the transformed data to a data sink that may be used for data delivery to the endpoint (or act as the endpoint itself). At step 408, the data received is ingested in a per-item and time series using ingest threads. The data may be ingested by inspecting the data using inspect operations that may be collected and/or joined together using logical and/or mathematical operators, which may define those inspection operations for identifying data parameters and determining endpoint destinations of the data for delivery. The ingest threads may determine data contents, "for-each" meta-conditions that iterates elements in an object array and applies an inspector to each value, IP address, JavaScript Object Notation (JSON) schema, JSON object validity, data or data value length, a random value evaluation choice, regex of the data, strings, and the like.

At step 410, the data is transformed to a data format used by designated system endpoints for data delivery using transform threads. Transform threads may receive the data for processing and transform, transcode, or otherwise format the data to a particular data format for the endpoint and/or data delivery, such as in a format that the endpoint handles, uses, or stores. The transform threads may use processors, which may correspond to and/or implement methods or processes to process data that allow for data transformations. These may have settings including conditions, keys, set keys, ignore closes of the processor, ignore errors of the processor, and the like. Processors may include code for aggregating, AWS DynamoDB, AWS Lambda, Base64, capturing new values via regex, letter case modification, value conversion, value copying into, from, and/or inside objects, value count, value deletion, DNS, domain, data dropping, data expansion, data flattening, "for-each" processes, object grouping, Gzip compression, IP database, HTTP, hash, static value insertion, value joining, key-value storing and/or retrieval of data, mathematical operation application, applying a series of these processors, applying or reversing formatting via Prettyprint, value replacement, value splitting in arrays, objects, or strings, time value conversion, and the like. At step 412, the transformed data is loaded and delivered using a load thread to the designated system endpoints. After data transformation, the data may be loaded to a data sink for permanent or semi-permanent (e.g., for a period of time) persistence where the data may be available for retrieval and/or delivery to endpoints. In this regard, the data sinks may include AWS DynamoDB, AWS Kinesis, AWS Kinesis Firehose, AWS S3, AWS SQS, gRPC, HTTP, Stdout, Sumo Logic, and/or the like. Thus, the data may be delivered via the cloud or other serverless computing environment without requiring a specific and designated server system that requires assignment of servers and configuration of server clusters. This may be provided by the computing code for the data pipeline being loaded, executed, and performed in the serverless environment.

Figure 5:
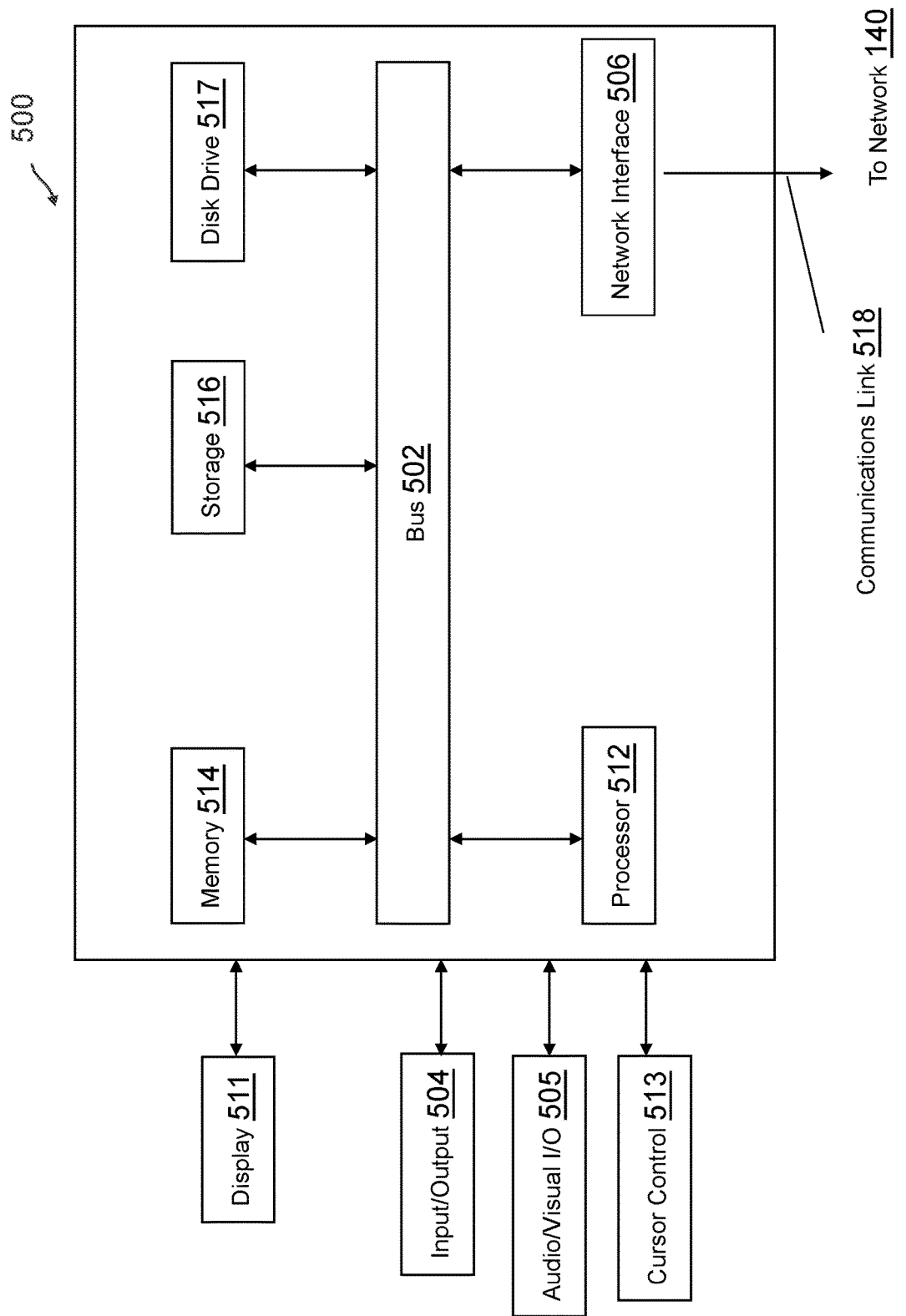
FIG. 5 is a block diagram of a computer system suitable for implementing one or more components in FIG. 1, according to an embodiment.

FIG. 5 is a block diagram of a computer system 500 suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio/visual input/output (I/O) component 505 may also be included to allow a user to use voice for inputting information by converting audio signals and/or input or record images/videos by capturing visual data of scenes having objects. Audio/visual I/O component 505 may allow the user to hear audio and view images/video including projections of such images/video. A transceiver or network interface 506 transmits and receives signals between computer system 500 and other devices, such as another communication device, service device, or a service provider server via network 140. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
a non-transitory memory; and
one or more hardware processors coupled to the non-transitory memory and configured to read instructions from the non-transitory memory to cause the system to perform operations comprising:
upon startup of an application executing in a serverless computing environment, loading data processing configurations for a data processing pipeline via which data is processed and delivered to system endpoints of the system;
creating a plurality of processing threads for the application, wherein the plurality of processing threads includes:
(i) at least one data ingestion thread for performing an ingestion operation,
(ii) at least one data transformation thread for performing a transformation operation, and
(iii) at least one data loading thread for performing a loading operation,
wherein the plurality of processing threads are created in reverse order such that (a) the at least one data loading thread is created before the at least one data transformation thread and (b) the at least one data transformation thread is created before the at least one data ingestion thread;
ingesting data received from a first one of the system endpoints using the at least one data ingestion thread of the plurality of processing threads;
transforming the data ingested by the at least one data ingestion thread using the at least one data transformation thread of the plurality of processing threads, wherein the at least one data transformation thread transforms the data into a data format utilized by a second one of the system endpoints designated to receive the data; and
loading the transformed data from the at least one data transformation thread to the second one of the system endpoints using the at least one data loading thread of the plurality of processing threads.

2. The system of claim 1, wherein the serverless computing environment comprises a cloud computing environment without designated server clusters that perform the operations, and wherein the operations are performed by the system using executable code in the cloud computing environment configured to execute application conditions of the data transformation configurations for evaluations and transformations of the data.

3. The system of claim 2, wherein the application conditions comprise a plurality of operators each having one or more inspectors for the data and one or more logical actions for the one or more inspectors, and wherein each of the one or more inspectors comprises a coded expression for inspecting the data for routing to the system endpoints through the data processing pipeline.

4. The system of claim 1, wherein the data processing pipeline is based on one or more pre-coded data packages that are configurable by users implementing the data processing pipeline with the system, and wherein the pre-coded data packages comprise executable code for data transformation patterns that identify patterns of data and transform the patterns of data to designated system endpoints.

5. The system of claim 1, wherein the loading comprises:
delivering, using a data sink configured to receive the transformed data as a destination node, the transformed data to the system endpoints using the loading thread, wherein the system endpoints comprise at least one of a user computing device, an administrator node, or a destination network address.

6. The system of claim 1, wherein the data is ingested on a per-item basis and in a time series based on timestamps of each datum in the data ingested by the system.

7. The system of claim 1, wherein the transforming comprises:
   executing one or more software processors configured to provide data transformation capabilities for singletons from the data and batches from the data; and
   formatting the data in the data format used by the system endpoints using the one or more software processors.

8. The system of claim 1, wherein the data is associated with at least one of a user login, a system activity, a security event log, or a system audit log, and wherein the operations further comprise:
   tracing the data through the data processing pipeline, wherein the tracing identifies the data format utilized to transform the data and the system endpoints that receive the data.

9. A method comprising:
   upon startup of an application executing in a serverless computing environment, loading data processing configurations for a data processing pipeline via which data is processed and delivered to system endpoints for processed and delivered to a system of a service provider;
   creating a plurality of processing threads for the application, wherein the plurality of processing threads includes:
   (i) at least one data ingestion thread for performing an ingestion operation,
   (ii) at least one data transformation thread for performing a transformation operation, and
   (iii) at least one data loading thread for performing a loading operation,
   wherein the plurality of processing threads are created in reverse order such that (a) the at least one data loading thread is created before the at least one data transformation thread and (b) the at least one data transformation thread is created before the at least one data ingestion thread;
   obtaining data received from a first one of the system endpoints using the at least one data ingestion thread of the plurality of processing threads;
   transforming the data ingested by the at least one data ingestion thread using the at least one data transformation thread of the plurality of processing threads,
   wherein the at least one data transformation thread transforms the data into a data format utilized by a second one of the system endpoints designated to receive the data; and
   loading the transformed data from the at least one data transformation thread to the second one of the system endpoints using the at least one data loading thread of the plurality of processing threads.

10. The method of claim 9, wherein the serverless computing environment comprises a cloud computing environment without designated server clusters that perform the operations, and wherein the operations are performed by the system using executable code in the cloud computing environment configured to execute application conditions of the data transformation configurations for evaluations and transformations of the data.

11. The method of claim 10, wherein the application conditions comprise a plurality of operators each having one or more inspectors for the data and one or more logical actions for the one or more inspectors, and wherein each of the one or more inspectors comprise a coded expression for inspecting the data for routing to the system endpoints through the data processing pipeline.

12. The method of claim 9, wherein the data processing pipeline uses one or more pre-coded data packages that are configurable by users implementing the data processing pipeline with the system, and wherein the pre-coded data packages comprise executable code for data transformation patterns that identify patterns of data and transform the patterns of data to designated system endpoints.

13. The method of claim 9, wherein the loading comprises:
   delivering, using a data sink configured to receive the transformed data as a destination node, the transformed data to the system endpoints using the loading thread, wherein the system endpoints comprise at least one of a user computing device, an administrator node, or a destination network address.

14. The method of claim 9, wherein the data is ingested on a per-item basis and in a time series based on timestamps of each datum in the data obtained by the system.

15. The method of claim 9, wherein the transforming comprises:
   executing one or more software processors configured to provide data transformation capabilities for singletons from the data and batches from the data; and
   formatting the data in the data format used by the system endpoints using the one or more software processors.

16. The method of claim 9, wherein the data is associated with at least one of a user login, a system activity, a security event log, or a system audit log, and wherein the method further comprises:
   tracing the data through the data processing pipeline, wherein the tracing identifies the data format utilized to transform the data and the system endpoints that receive the data.

17. A non-transitory machine-readable medium having stored thereon machine-readable instructions executable to cause a machine to perform operations comprising:
   upon startup of an application executing in a serverless computing environment, loading data processing configurations for a data processing pipeline via which data is processed and delivered to system endpoints for a system of a service provider;
   creating a plurality of processing threads for the application, wherein the plurality of processing threads includes:
   (i) at least one data ingestion thread for performing an ingestion operation,
   (ii) at least one data transformation thread for performing a transformation operation, and
   (iii) at least one data loading thread for performing a loading operation,
   wherein the plurality of processing threads are created in reverse order such that (a) the at least one data loading thread is created before the at least one data transformation thread and (b) the at least one data transformation thread is created before the at least one data ingestion thread;
   receiving data using the at least one data ingestion thread of the plurality of processing threads;
   transforming the received data using the at least one data transformation thread of the plurality of processing threads,
   wherein the at least one data transformation thread transforms the data into a data format utilized by a second one of the system endpoints designated to receive the data; and
   loading the transformed data from the at least one data transformation thread to the second one of the system endpoints using the at least one data loading thread of the plurality of processing threads.

18. The non-transitory machine-readable medium of claim 17, wherein the serverless computing environment comprises a cloud computing environment without designated server clusters that perform the operations, and wherein the operations are performed using executable code in the cloud computing environment configured to execute application conditions of the data transformation configurations for evaluations and transformations of the data.

19. The non-transitory machine-readable medium of claim 18, wherein the application conditions comprise a plurality of operators each having one or more inspectors for the data and one or more logical actions for the one or more inspectors, and wherein each of the one or more inspectors comprises a coded expression for inspecting the data for routing to the system endpoints through the data processing pipeline.

20. The non-transitory machine-readable medium of claim 17, wherein the data processing pipeline is based on one or more pre-coded data packages that are configurable by users implementing the data processing pipeline with the system, and wherein the pre-coded data packages comprise executable code for data transformation patterns that identify patterns of data and transform the patterns of data to designated system endpoints.

21. The non-transitory machine-readable medium of claim 17, wherein each of the data processing configurations is representative of a coded operation that provides a method for evaluating the data using a user-defined success criterion or failure criterion.

22. The non-transitory machine-readable medium of claim 21, wherein the coded operations are implemented through one or more inspectors and one or more operators, wherein each inspector is representative of an inspection method for evaluating data based on content, Internet Protocol (IP) address, length, regular expression, or strings, and wherein each operator is representative of a collection of multiple inspectors that implement an evaluation pattern and utilize an operator.

* * * * *